(12) United States Patent
Dams et al.

(10) Patent No.: US 7,728,098 B2
(45) Date of Patent: Jun. 1, 2010

(54) FLUOROCHEMICAL COMPOSITION COMPRISING FLUORINATED OLIGOMERIC SILANE

(75) Inventors: Rudolf J. Dams, Antwerp (BE); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 933 days.

(21) Appl. No.: 11/460,303

(22) Filed: Jul. 27, 2006

(65) Prior Publication Data

US 2008/0027203 A1    Jan. 31, 2008

(51) Int. Cl.
*C08G 18/28* (2006.01)
*C08L 27/12* (2006.01)
*C07F 7/02* (2006.01)

(52) U.S. Cl. .................. 528/70; 528/374; 524/544; 524/546; 556/485

(58) Field of Classification Search ............ 528/42
See application file for complete search history.

(56) References Cited

U.S. PATENT DOCUMENTS

| | | | |
|---|---|---|---|
| 4,778,915 A | 10/1988 | Lina et al. | |
| 4,908,297 A * | 3/1990 | Head et al. | 430/284.1 |
| 5,144,056 A | 9/1992 | Lina et al. | |
| 5,276,175 A | 1/1994 | Dams et al. | |
| 5,453,540 A | 9/1995 | Dams et al. | |
| 6,001,923 A * | 12/1999 | Moncur et al. | 524/590 |
| 6,646,088 B2 | 11/2003 | Fan et al. | |
| 6,689,854 B2 * | 2/2004 | Fan et al. | 526/243 |
| 6,790,924 B2 | 9/2004 | Anton et al. | |
| 6,803,109 B2 * | 10/2004 | Qiu et al. | 428/423.1 |
| 6,977,307 B2 * | 12/2005 | Dams | 556/485 |
| 7,247,386 B2 * | 7/2007 | Hooftman et al. | 428/447 |
| 2003/0224112 A1 * | 12/2003 | Dams | 427/372.2 |
| 2004/0063851 A1 * | 4/2004 | Neppl et al. | 524/589 |
| 2004/0077775 A1 * | 4/2004 | Audenaert et al. | 524/567 |
| 2004/0147188 A1 | 7/2004 | Johnson et al. | |
| 2005/0143541 A1 * | 6/2005 | Caldwell et al. | 526/242 |
| 2006/0142519 A1 * | 6/2006 | Qiu et al. | 526/319 |
| 2006/0142530 A1 * | 6/2006 | Moore et al. | 528/44 |
| 2007/0173149 A1 * | 7/2007 | Caldwell et al. | 442/94 |

FOREIGN PATENT DOCUMENTS

| | | |
|---|---|---|
| EP | 1 225 187 | 7/2002 |
| EP | 1 225 188 | 7/2002 |
| EP | 1 369 453 | 12/2003 |
| JP | 08-231724 | 9/1996 |
| WO | WO 02/30848 | 4/2002 |
| WO | WO 03/040209 | 5/2003 |
| WO | WO 03/040247 | 5/2003 |

OTHER PUBLICATIONS

Chemtech (1977), V. 7 pp. 766-778.

* cited by examiner

*Primary Examiner*—Randy Gulakowski
*Assistant Examiner*—Robert Loewe
(74) *Attorney, Agent, or Firm*—Kathleen B. Gross; Robert H. Jordan

(57) ABSTRACT

Fluorochemical oligomeric silanes, compositions comprising such silanes and/or the condensation products of such silanes, and coatings produced with such compositions.

20 Claims, No Drawings

FLUOROCHEMICAL COMPOSITION COMPRISING FLUORINATED OLIGOMERIC SILANE

FIELD

The present invention relates to fluorochemical compositions comprising fluorinated oligomer silane dissolved or dispersed in an organic solvent. The invention further relates to the fluorinated oligomeric silane used in the composition. The invention also relates to compositions comprising condensation products of the fluorinated oligomeric silane and to a method of treating a substrate with the fluorochemical compositions.

BACKGROUND

The use of fluorinated silanes, i.e., silane compounds that have one or more fluorinated groups for rendering substrates such as glass and ceramics oil and water repellent are known. For example EP 1341741 describes compositions comprising fluorinated polyether silanes for rendering ceramics oil and water repellent. EP 1225187 discloses fluorochemical compositions containing an oligomeric fluorochemical silane dissolved or dispersed in an organic solvent. The fluorochemical compositions are particularly useful for rendering substrates such as ceramics and glass water and/or oil repellent.

EP 1369453 relates to a fluorochemical composition comprising (a) a fluorinated oligomer that comprises one or more groups capable of undergoing a polycondensation reaction and (b) a non-fluorinated compound that has groups capable of polycondensation. The invention also relates to compositions that comprise a partial or substantially complete condensate of the components (a) and (b). The fluorochemical compositions can be used to treat substrates and are capable of rendering such substrates oil and water repellent and/or to provide stain repellency thereto.

Further coating compositions containing perfluoropolyethersilanes and alkoxysilanes are described in EP1444305 and EP 1444289.

Despite the many known fluorochemical compositions to provide repellency properties to a substrate, there continues to be a desire to find further compositions, in particular those that have improved durability, i.e., the repellency properties last longer even under abrading conditions.

SUMMARY

The present invention provides a coating composition capable of providing a highly durable water, oil, and/or stain repellent coating on a substrate. In particular, compositions of the invention are useful to provide a durable coating wherein the initial, repellent properties are substantially maintained, even under abrading conditions or extended use. Further, the coating compositions can be applied and used in an environmental friendly way and can be produced in a reliable, convenient and cost effective way.

The present invention provides a fluorochemical composition comprising, dissolved or dispersed in an organic solvent:

(a) a fluorinated oligomeric silane being represented by the general formula $$X\text{-}M^f_n M^h_m M^a_r\text{-}G \qquad (I)$$

wherein X represents an end group; $M^f$ represents units derived from fluorinated monomers obtainable from a condensation of a fluorinated alcohol, a polyisocyanate, and an isocyanate reactive non-fluorinated monomer; $M^h$ represents units derived from non-fluorinated monomers; $M^a$ represents units having a silyl group represented by the formula:

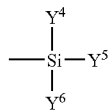

wherein each of $Y^4$, $Y^5$, and $Y^6$ independently represents an alkyl group, an aryl group, or a hydrolyzable group, and at least one of $Y^4$, $Y^5$, and $Y^6$ represents a hydrolyzable group;

G is a monovalent organic group comprising the residue of a chain transfer agent; n represents a value of 1 to 100; m represents a value of 0 to 100; r represents a value of 0 to 100; and n+m+r is at least 2;

with the proviso that at least one of the following conditions is fulfilled: (i) G is a monovalent organic group that contains a silyl group of the formula:

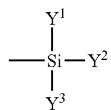

wherein $Y^1$, $Y^2$, and $Y^3$ each independently represents an alkyl group, an aryl group, or a hydrolyzable group with at least one of $Y^1$, $Y^2$, and $Y^3$ representing a hydrolyzable group; or (ii) r is at least 1; and, in some embodiments, (b) a non-fluorinated compound of an element M selected from the group consisting of Si, Ti, Zr, B, Al, Ge, V, Pb, Sn, and Zn and having at least two hydrolyzable groups per molecule.

In a further aspect, the present invention provides a composition comprising a reaction product obtainable after a partial or substantially complete condensation reaction of fluorinated oligomeric silane and non-fluorinated compound defined as component (b) above. By the term "substantially complete condensation reaction" is meant that the reaction is either complete or at least 80 percent of the hydrolyzable groups in the mixture have disappeared, preferably at least 90 percent. Completion of the reaction can be monitored through the use of infrared spectroscopy and Si-NMR. By "partial condensation" and "partial condensate" in connection with the present invention is meant that some of the hydrolyzable groups in the mixture have reacted while leaving a substantial amount of hydrolyzable groups available for a further condensation or crosslinking reaction. Typically, a partial condensate means that at least 20 percent, preferably at least 30 percent, and more preferably at least 50 percent of the hydrolyzable groups are still available for further condensation reaction.

The present invention further provides a product obtainable from reacting fluorinated oligomeric silane and non-fluorinated compound as defined above.

In a still further aspect, the present invention also provides a method for treating a substrate, comprising the step of applying to at least a portion of the surface of the substrate the compositions as defined above. The fluorochemical compositions of the present invention can be used to treat substrates and are capable of rendering such substrates oil and water repellent and/or to provide stain repellency and stain release thereto.

In a still further aspect, the present invention provides a fluorinated oligomeric silane being represented by the general formula:

$$X\text{-}M^f_n M^h_m M^a_r\text{-}G \qquad (I)$$

wherein X represents an end group; $M^f$ represents units derived from fluorinated monomers obtainable from a condensation of a fluorinated alcohol, a polyisocyanate, and an isocyanate reactive non-fluorinated monomer; $M^h$ represents units derived from non-fluorinated monomers; $M^a$ represents units having a silyl group represented by the formula:

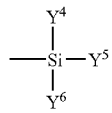

wherein each of $Y^4$, $Y^5$, and $Y^6$ independently represents an alkyl group, an aryl group or a hydrolyzable group and at least one of $Y^4$, $Y^5$, and $Y^6$ represents a hydrolyzable group;

G is a monovalent organic group comprising the residue of a chain transfer agent; n represents a value of 1 to 100; m represents a value of 0 to 100; r represents a value of 0 to 100; and n+m+r is at least 2;

with the proviso that at least one of the following conditions is fulfilled: (i) G is a monovalent organic group that contains a silyl group of the formula:

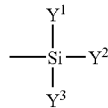

wherein $Y^1$, $Y^2$ and $Y^3$ each independently represents an alkyl group, an aryl group, or a hydrolyzable group with at least one of $Y^1$, $Y^2$, and $Y^3$ representing a hydrolyzable group; or (ii) r is at least 1.

The compositions are generally effective at low levels of application and have good durability. The compositions are particularly useful for rendering substrates such as ceramics, (porous) stone, glass, inox, chromated steel, wood, textile, and leather, repellent to water and/or oil.

DETAILED DESCRIPTION OF ILLUSTRATIVE EMBODIMENTS

The term "hydrolyzable group" in connection with the present invention refers to a group which either is directly capable of undergoing condensation reactions under typical condensation reaction conditions or which is capable of hydrolyzing under these conditions, thereby yielding a compound, which is capable of undergoing condensation reactions. Examples of hydrolyzable groups include halogens such as chlorine, alkoxy groups, aryloxy groups, acyl groups and acyloxy groups. Typical condensation reaction conditions include acidic or basic conditions. Hence, under these reaction conditions, fluorochemical compositions according to the invention can be caused to undergo condensation reactions and/or react with the substrate to provide for a durable coating on the substrate. The thus formed coating can display the desired durable oil and water repellent properties.

The term "non-hydrolyzable group" as used in the present invention refers to a group other than a hydrolyzable group as defined above.

The fluorinated oligomeric silanes represented by formula (I) are generally oligomers that can be prepared by free-radical oligomerization of a first fluorinated monomer in the presence of a chain transfer agent. The oligomers should also include one or more silyl groups that have one or more hydrolyzable groups. The silyl groups having one or more hydrolyzable groups can be included in the fluorinated oligomeric silane by copolymerising the first fluorinated monomer with a monomer having a silyl group that has one or more hydrolyzable groups and/or through the use of chain transfer agent that includes such a silyl group. Alternatively, a functionalised chain transfer agent or functionalised comonomer can be used which can be reacted with a reagent having a silyl group having one or more hydrolyzable groups subsequent to the oligomerization.

The total number of units represented by the sum of n, m, and r in formula (I) is generally at least 2, and preferably at least 3 so as to render the compound oligomeric. The value of n in the fluorinated oligomeric silane is typically from 1 to 100 and particularly suitable from 2 to 20. The values of m and r are typically from 0 to 100 and preferably from 1 to 30. According to a particular embodiment, the value of m is less than that of n and n+m+r is at least 2.

The fluorinated oligomeric silanes typically have a weight average molecular weight from about 400 g/mol to about 100,000 g/mol, preferably from about 1000 g/mol to about 20,000 g/mol. The fluorinated oligomers preferably contain at least about 10 mole percent (based on total moles of units $M^f$, $M^h$, and $M^a$) of hydrolyzable groups.

It will further be appreciated by one skilled in the art that the preparation of fluorinated oligomeric silanes used in the composition of the present invention results in a mixture of compounds and accordingly, general formula (I) may represent a mixture of compounds whereby the indices n, m and r in formula (I) represent the molar amount of the corresponding unit in such mixture. Accordingly, it will be clear that n, m, and r can be fractional values.

The units $M^f$ in formula (I) representing the fluorinated oligomeric silanes are generally derived from first fluorinated monomers obtainable from a condensation of a fluorinated alcohol, a polyisocyanate and an isocyanate reactive non-fluorinated monomer.

The fluorinated alcohol is typically a monofunctional alcohol or diol that is partially fluorinated or fully fluorinated. Generally the fluorinated alcohol will contain at least a per-fluorinated moiety. Suitable fluorinated alcohols include those selected from monofunctional fluorinated alkanols or fluorinated diols having at least 3, preferably from 3 to 6 carbon atoms, perfluoropolyether compounds having one or more perfluorinated polyether groups and one or more hydroxyl groups or an oligomeric fluorinated alcohol or diol. Mixtures of fluorinated alcohols are contemplated for use as well.

In one embodiment, the fluorinated alcohol is a monofunctional alkanol or alkanediol that can be represented by the formula II:

$$PF^1\text{-}Q^1\text{-}(OH)_a \qquad (II)$$

wherein $PF^1$ represents a perfluorinated aliphatic group, $Q^1$ is an organic di- or trivalent linking group, and a is 1 or 2, preferably 1. The perfluorinated aliphatic group $PF^1$ is a perfluorinated, stable, inert, preferably saturated, non-polar, monovalent aliphatic radical containing 3 to 6 carbon atoms. It can be straight chain or branched chain. Especially suitable fluorinated alcohols are those of which the $PF^1$-group has 4 to 6 carbon atoms and is of the formula $C_4F_9$— or $C_6F_{13}$—.

Linking group $Q^1$ is generally non-fluorinated or partially fluorinated and may contain from 1 to about 20 carbon atoms. $Q^1$ may include aromatic or aliphatic groups and can optionally contain oxygen, nitrogen, or sulfur-containing groups or a combination thereof. Examples of suitable linking groups $Q^1$ include straight chain, branched chain or cyclic alkylene, arylene, aralkylene, sulfonyl, sulfoxy, sulfonamido, carbonamido, carbonyloxy, urethanylene, ureylene, and combinations thereof such as sulfonamidoalkylene.

Specific illustrative examples of fluorinated alkanols or alkanediols useful herein include:
$CF_3CF_2CF_2CF_2CH_2CH_2OH$,
$CF_3CF_2CF_2CF_2CF_2CF_2CH_2CH_2OH$,
$CF_3(CF_2)_3SO_2N(CH_3)CH_2CH_2OH$,
$CF_3(CF_2)_3SO_2N(CH_3)CH_2CH(OH)CH_2OH$,
$CF_3(CF_2)_3SO_2N(C_2H_5)CH_2CH_2OH$,
$CF_3(CF_2)_3SO_2N(C_2H_5)CH_2CH(OH)CH_2OH$,
$CF_3(CF_2)_3SO_2N(CH_3)CH_2CH(CH_3)OH$, and
$(CF_3)_2CFCF_2SO_2N(CH_3)CH_2CH_2OH$.

In an alternative embodiment of the invention, the fluorinated alcohol may be a perfluoropolyether compound having one or more perfluorinated polyether groups and one or more hydroxyl groups. By the term "perfluoropolyether compound" is meant a compound having a fluorinated polyether group that consists of carbon and fluorine and that contains at least two ether linkages.

In one embodiment the perfluoropolyether compound can be represented by the formula III:

  (III)

wherein $PF^2$ represents a perfluoropolyether group, $Q^2$ represents a divalent or trivalent generally non-fluorinated or partially fluorinated organic linking group, and b is 1 or 2, preferably 1. Examples of linking groups $Q^2$ include organic groups that comprise aromatic or aliphatic groups that may be interrupted by O, N, or S and that may be substituted, alkylene groups, oxy groups, thio groups, urethane groups, carboxy groups, carbonyl groups, amido groups, oxyalkylene groups, thioalkylene groups, carboxyalkylene, and/or amidoalkylene groups.

In one particular embodiment, the perfluorinated polyether group $PF^2$ of formula (III) is a monovalent perfluoropolyether moiety composed of groups according to formula IV:

  (IV)

wherein each $R_{fc}$ independently represents a perfluorinated alkylene group, each x independently represents an integer greater than or equal to 3, and d is an integer from 1 to 6. The perfluoroalkylene group $R_{fc}$ may be linear or branched and may comprise from 1 to 10 carbon atoms, preferably from 1 to 6 carbon atoms. Examples of perfluorinated alkyleneoxy groups $—R_{fc}O—$ include: $—CF_2CF_2O—$, $—CF(CF_3)CF_2O—$, $—CF_2CF(CF_3)O—$, $—CF_2CF_2CF_2O—$, $—CF_2O—$, $—CF(CF_3)O—$, $—CF_2CF_2CF_2CF_2—O—$. The perfluorinated polyether group may be comprised of the same perfluorinated alkylene oxy units or of a mixture of different perfluorinated alkylene oxy units. When the perfluorinated polyether group is composed of different perfluorinated alkylene oxy units, they can be present in a random configuration, alternating configuration or they can be present as blocks. Typical examples of perfluorinated polyalkylene oxy groups include:
$—[CF_2CF_2O]_r—$; $—[CF(CF_3)CF_2O]_s—$; $—[CF_2CF_2O]_i[CF_2O]_j—$ and $—[CF_2CF_2O]_r—[CF(CF_3)CF_2O]_k—$;
wherein r is an integer of 5 to 25, s is an integer of 3 to 25, and i, j, l, and k each are integers of 3 to 25.

A particularly suitable perfluorinated polyether group that corresponds to formula (IV) is:

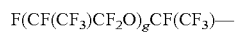

wherein g is at least 3. Perfluorinated polyether groups of the above formula can conveniently be derived from the oligomerization of hexafluoropropyleneoxide (HFPO). In a particular suitable embodiment, g is an integer of 3 to 25, and the corresponding perfluorinated polyether group has a molecular weight of at least about 750 g/mol.

Suitable examples of perfluoropolyether compounds according to formula (III) include:
$CH_2CHOHCH_2OH$ wherein $R^c$ is hydrogen or an alkyl group of for example 1 to 4 carbon atoms;
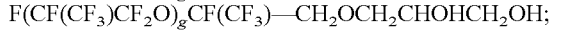
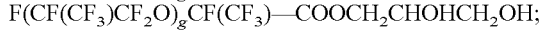
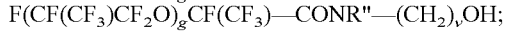
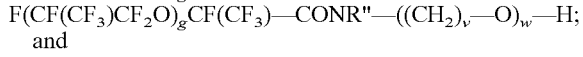
and
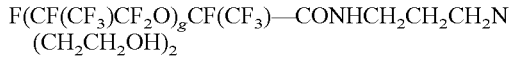

where R" is hydrogen or an alkyl group such as methyl, ethyl, propyl, butyl, or hexyl; and v is 2, 3, 4, 6, 8, 10, or 11, w is 1 to 4; and g is at least 3. A particularly suitable example is $F(CF(CF_3)CF_2O)_gCF(CF_3)CONR^d(CH_2)_vOH$ where $R^d$ is hydrogen, v is 2, and g is at least 3.

In a further embodiment of the present invention, the fluorinated alcohol can be an oligomeric fluorinated alcohol or diol that can be represented by to formula:

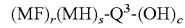

wherein c is 1 or 2, preferably 1, $(MF)_r(MH)_s$ represents a fluorinated oligomer comprising r units derived from a second fluorinated monomer and s units derived from a non-fluorinated monomer, e.g., a hydrocarbon monomer, r typically represents a value of 2 to 40, s is typically 0 to 20, and $-Q^3-(OH)_c$ together represents the organic residue obtained by removing a hydrogen atom from a chain transfer agent that is functionalized with an alcohol or diol. The value of r in the oligomeric fluorinated alcohol is typically between 2 and 40, preferably between 2 and 20, and more preferably between 3 and 15. Fluorinated oligomers derived from two or more different second fluorinated monomers and optional non-fluorinated monomers are also suitable.

In the above formula, $Q^3$ typically represents an organic residue according to the formula —S—R— wherein R represents an organic divalent linking group that is preferably selected from the group consisting of linear or branched alkylenes (preferably having about 2 to 6 carbon atoms), cyclic alkylenes, arylenes, and aralkylenes.

The oligomeric fluorinated alcohol can be prepared by free-radical oligomerization of fluorinated and non-fluorinated monomers in the presence of hydroxy functionalized chain transfer agents. The aliphatic backbone of the oligomeric fluorinated alcohol comprises a sufficient number of polymerized units to render the portion oligomeric, e.g., such that the sum of r and s in the above formula is from 2 to 60.

In one embodiment, the second fluorinated monomer can be represented by the formula:

wherein $R_f$ represents a fluorinated aliphatic group having at least 3 carbon atoms, Q represents a non-fluorinated divalent linking group, and $E^1$ is an ethylenically unsaturated group capable of free radical polymerization.

In a particular embodiment, the second fluorinated monomer is an ester of an α,β-ethylenically unsaturated carboxylic acid, containing a perfluoroaliphatic group and can be represented by the general formula:

$$PF^3-Q^4-OC(O)-C(R')=CH_2$$

wherein $PF^3$ represents a perfluorinated aliphatic group having 3 to 6 carbon atoms, $Q^4$ is an organic divalent linking group, and R' represents hydrogen, fluorine, or a lower alkyl group having 1 to 4 carbon atoms.

The perfluorinated aliphatic group $PF^3$ is a perfluorinated, stable, inert, preferably saturated, non-polar, monovalent aliphatic radical containing 3 to 6 carbon atoms. It can be straight chain or branched chain. Especially suitable second fluorinated monomers are those of which the $PF^3$-group is of the formula $C_4F_9-$ or $C_6F_{13}-$.

The linking group $Q^4$ links the perfluorinated aliphatic group $PF^3$ to the free radical polymerizable group. Linking group $Q^4$ is generally non-fluorinated and preferably contains from 1 to about 20 carbon atoms. $Q^4$ can optionally contain oxygen, nitrogen, or sulfur-containing groups or a combination thereof, and $Q^4$ is free of functional groups that substantially interfere with free-radical polymerization (e.g., polymerizable olefinic double bonds, thiols, and other such functionality known to those skilled in the art). Examples of suitable linking groups $Q^4$ include straight chain, branched chain or cyclic alkylene, arylene, aralkylene, sulfonyl, sulfoxy, sulfonamido, carbonamido, carbonyloxy, urethanylene, ureylene, and combinations thereof such as sulfonamidoalkylene.

Specific examples of second fluorinated monomers include:

$CF_3CF_2CF_2CF_2CH_2CH_2OCOCR^1=CH_2$;
$CF_3(CF_2)_5CH_2CH_2OCOCR^1=CH_2$;
$CF_3(CF_2)_3CH_2OCOCR^1=CH_2$;
$CF_3(CF_2)_3SO_2N(CH_3)CH_2CH_2OCOCR^1=CH_2$;
$CF_3(CF_2)_3 SO_2N(C_2H_5)CH_2CH_2OCOCR^1=CH_2$;
$CF_3(CF_2)_3 SO_2N(CH_3)CH_2CH(CH_3)OCOCR^1=CH_2$; and
$(CF_3)_2CFCF_2SO_2N(CH_3)CH_2CH_2OCOCR^1=CH_2$ wherein $R^1$ is hydrogen or methyl.

The non-fluorinated monomer useful in the synthesis of the oligomeric fluorinated alcohol or diol is typically a monomer containing an ethylenically unsaturated group capable of free radical polymerization and a hydrocarbon moiety. Hydrocarbon group containing monomers are well known and generally commercially available. Examples of non-fluorinated monomers include for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

The oligomeric fluorinated alcohol or diol is typically prepared in the presence of a hydroxyl functionalized chain transfer agent. Examples of hydroxyl functionalized chain transfer agents include those selected from 2-mercaptoethanol, 3-mercapto-2-butanol, 3-mercapto-2-propanol, 3-mercapto-1-propanol, 11-mercapto-1-undecanol and 3-mercapto-1,2-propanediol. A single compound or a mixture of different chain transfer agents may be used. A particular suitable chain transfer agent is 2-mercaptoethanol.

In order to prepare the oligomeric fluorinated alcohol, a free radical initiator is normally present. Such free radical initiators are known in the art and include azo compounds, such as azobisisobutyronitrile (AIBN) and azobis(2-cyanovaleric acid) and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The first fluorinated monomers for use in preparing a fluorinated oligomeric silane of formula (I) and from which the units $M^f$ in formula (I) are derivable, are typically prepared by a condensation reaction of a fluorinated alcohol, a polyisocyanate and an isocyanate reactive non-fluorinated monomer.

Suitable polyisocyanates for preparing the first fluorinated monomer include those that can be selected from one or more aliphatic isocyanates having 2, 3, or 4 isocyanate groups, one or more aromatic isocyanates having 2, 3, or 4 isocyanate groups and mixtures thereof. Examples of aliphatic diisocyanates include hexamethylenediisocyanate, 2,2,4-trimethyl-1,6-hexamethylenediisocyanate, and 1,2-ethylenediisocyanate, dicyclohexylmethane-4,4'-diisocyanate and 3-isocyanatomethyl-3,5,5-trimethylcyclohexylisocyanate (isophorone diisocyanate IPDI). Examples of aliphatic triisocyanates include 1,3,6-hexamethylenetriisocyanate, cyclic trimer of hexamethylenediisocyanate and cyclic trimer of isophorone diisocyanate (isocyanurates). Examples of aromatic diisocyanates include 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Examples of aromatic triisocyanates include polymethylenepolyphenylisocyanate (PAPI).

Also useful are isocyanates containing internal isocyanate-derived moieties such as biuret-containing triisocyanates, such as DESMODUR™ N100 or TOLONATE HDB, commercially available from Bayer or Rhodia respectively; isocyanurate-containing tri-isocyanates, such as IPDI-1890, commercially available from Huls AG; azetedinedione-containing diisocyanates such as DESMODUR™ TT, commercially available from Bayer. Also, other commercially available di- or tri-isocyanates such as DESMODUR™ L and DESMODUR™ W, tri-(4-isocyanatophenyl)-methane (DESMODUR™ R) (all available from Bayer) and DDI 1410 (available from Henkel) are suitable.

Isocyanate reactive non-fluorinated monomers include in monomers having a hydroxyl group including for example hydroxy functional vinyl ethers, acrylamides and particularly suitable isocyanate reactive acrylates and methacrylates. Particularly suitable examples of isocyanate reactive acrylate or methacrylate non-fluorinated monomers include hydroxyethyl(meth)acrylate, hydroxypropyl(meth)acrylate, and butanediol monoacrylate. Further suitable monomers include monomers comprising (poly)oxyalkylene groups including (meth)acrylates of a polyethylene glycol, (meth)acrylates of a block copolymer of ethylene oxide and propylene oxide, and (meth)acrylates of aminoterminated polyethers. Single isocyanate reactive acrylate or methacrylate non-fluorinated monomers can be used or mixtures thereof.

The first fluorinated monomers used in the preparation of the fluorinated oligomeric silanes of formula (I), are typically prepared in the presence of a catalyst. Suitable catalysts include tin salts such as dibutyltin dilaurate, stannous octanoate, stannous oleate, tin dibutyldi-(2-ethyl hexanoate), stannous chloride and others known in the art. The amount of catalyst present will depend on the particular reaction and reactants used. Generally, suitable catalyst concentrations are from about 0.001 to about 10 percent by weight, particularly suitably between about 0.05 and about 5 percent by weight based on the total weight of reactants.

The first fluorinated monomer can be prepared in a single step reaction. In an alternative embodiment, the first fluorinated monomer can be prepared in a two step reaction wherein in a first step, the fluorinated alcohol and the polyisocyanate can be reacted in a ratio such that a resulting reaction product has one or more free isocyanate groups. In a second step, the free isocyanate groups can be further reacted with the isocyanate reactive non-fluorinated monomer. Alternatively, the non-fluorinated isocyanate reactive monomer may be first reacted with the polyisocyanate followed by a reaction with the fluorinated alcohol. Generally the amounts of the fluorinated alcohol, polyisocyanate, and isocyanate reactive non-fluorinated monomer are chosen such that the molar amounts of alcohol groups and isocyanate groups are equal or about equal. By their method of synthesis, urethane based first fluorinated monomers are generally mixtures.

The reaction is preferably carried out under dry conditions. Suitable reaction temperature will depend on the reagents and kind and amount of catalyst used. Generally suitable temperatures are from room temperature to about 120° C.

The units $M^h$ of the fluorinated oligomeric silane as represented by formula (I) are generally derived from a non-fluorinated monomer, preferably a monomer containing an ethylenically unsaturated group and a hydrocarbon moiety.

In a particular embodiment, the non-fluorinated monomers include those according to formula (V):

$$R^h\text{-}L_k\text{-}E \quad (V)$$

wherein $R^h$ represents a hydrogen atom or a non-fluorinated organic group such as, for example, a hydrocarbon group that may optionally be substituted with, e.g., halogens, nitrile groups, hydroxyl groups, amino groups and that may optionally contain a catenary heteroatom L represents an organic divalent linking group such as for example —O—, —OOC—, or an amide group, k is 0 or 1, and E represents an ethylenically unsaturated group.

Examples of non-fluorinated monomers from which the units $M^h$ can be derived include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylcloride and vinylidene chloride.

The fluorinated oligomeric silane represented by formula (I) generally further includes units $M^a$ that have a silyl group having at least one hydrolyzable group that can be represented by the formula:

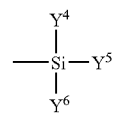

wherein each of $Y^4$, $Y^5$, and $Y^6$ each independently represents an alkyl group, preferably a $C_1$-$C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolyzable group such as for example halogen or alkoxy group such as methoxy, ethoxy or aryloxy group, with at least one of $Y^4$, $Y^5$, and $Y^6$ representing a hydrolyzable group.

In a particular embodiment units $M^a$ include those that correspond to the general formula (VI):

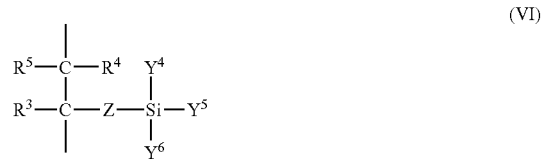

wherein $R^3$, $R^4$, and $R^5$ each independently represents hydrogen, an alkyl group such as for example methyl or ethyl, halogen, or an aryl group, Z represents an organic divalent linking group, and $Y^4$, $Y^5$, and $Y^6$ are as defined above.

Such units $M^a$ may be derived from a monomer represented by the formula (VII):

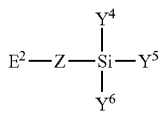

wherein each of $Y^4$, $Y^5$, and $Y^6$ each independently represents an alkyl group, preferably a $C_1$ to $C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolyzable group such as for example halogen or alkoxy group such as methoxy, ethoxy or aryloxy group, with at least one of $Y^4$, $Y^5$, and $Y^6$ representing a hydrolyzable group; Z represents an organic divalent linking group; and $E^2$ represents an ethylenically unsaturated group.

Alternatively such units $M^a$ according to formula VI can be obtained by reacting a functionalized monomer with a silyl group containing reagent as will be described furtheron. By the term "functionalised monomer" is meant a monomer that has one or more groups available for subsequent reaction, for example a group capable of undergoing a condensation reaction. Typically, the functionalised monomer is a monomer that has one or more groups capable of reacting with an isocyanate or epoxy groups. Specific examples of such groups include hydroxy and amino groups.

Z represents an organic divalent linking group and typically contains from 1 to 20 carbon atoms. Z can optionally contain oxygen, nitrogen, or sulfur-containing groups or a combination thereof, and Z is preferably free of functional groups that substantially interfere with free-radical oligomerization (e.g., polymerizable olefinic double bonds, thiols, and other such functionality known to those skilled in the art). Examples of suitable linking groups Z include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Preferred linking groups are selected from the group consisting of alkylene, oxyalkylene and carbonyloxyalkylene. According to a particularly preferred embodiment, the linking group Z corresponds to the formula:

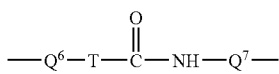

wherein $Q^6$ and $Q^7$ independently represents an organic divalent linking group. Examples of organic divalent linking groups $Q^6$ include for example an alkylene, an arylene, oxyalkylene, carbonyloxyalkylene, oxycarboxyalkylene, carboxyamidoalkylene, urethanylenealkylene and ureylenealkylene. Examples of organic divalent linking groups $Q^7$ include for example alkylene and arylene. T represents O or NR wherein R represents hydrogen, a $C_1$ to $C_4$ alkyl group or an aryl group.

Examples of monomers according to formula (VII) include vinyltrichlorosilane, vinyltrimethoxysilane, vinyltriethoxysilane and alkoxysilane functionalised acrylates or methacrylates, such as methacryloyloxypropyl trimethoxysilane.

The fluorinated oligomeric silane is conveniently prepared through a free radical polymerization of first fluorinated monomer with optionally a non-fluorinated monomer and a monomer containing the silyl group in the presence of a chain transfer agent. A free radical initiator is generally used to initiate the polymerization or oligomerization reaction. Commonly known free-radical initiators can be used and examples thereof include azo compounds, such as azobisisobutyronitrile (AIBN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The oligomerization reaction can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), esters (e.g., ethyl acetate, butyl acetate), alcohols (e.g., ethanol, isopropyl alcohol), ketones (e.g., acetone, methylethyl ketone, methyl isobutyl ketone), sulfoxides (e.g., dimethyl sulfoxide), amides (e.g., N,N-dimethylformamide, N,N-dimethylacetamide), halogenated solvents such as methylchloroform, FREON™113, trichloroethylene, α,α,α-trifluorotoluene, and the like, and mixtures thereof.

The oligomerization reaction can be carried out at any temperature suitable for conducting an organic free-radical reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are from about 30° C. and to about 200° C.

The fluorinated oligomeric silane is prepared in the presence of a chain transfer agent. Suitable chain transfer agents may include a hydroxy-, amino-, mercapto or halogen group. The chain transfer agent may include two or more of such hydroxy, amino-, mercapto or halogen groups. Typical chain transfer agents useful in the preparation of the fluorinated oligomeric silane include those selected from 2-mercaptoethanol, 3-mercapto-2-butanol, 3-mercapto-2-propanol, 3-mercapto-1-propanol, 3-mercapto-1,2-propanediol, 2-mercapto-ethylamine, di(2-mercaptoethyl)sulfide, octylmercaptane, dodecylmercaptane and mercapto octadecyl propionate.

In a particular suitable embodiment a chain transfer agent containing a silyl group having one or more hydrolyzable groups is used in the oligomerization to produce the fluorinated oligomeric silane. Chain transfer agents including such a silyl group include those according to formula VIII.

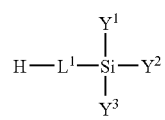

wherein $Y^1$, $Y^2$, and $Y^3$ each independently represents an alkyl group, preferably a $C_1$ to $C_8$ alkyl group such as methyl, ethyl or propyl or an alkyl group containing a cycloalkyl such as cyclohexyl or cylcopentyl, an aryl group such as phenyl, an alkylaryl group or an aralkyl group, a hydrolyzable group such as for example halogen or alkoxy group such as methoxy, ethoxy or aryloxy group, with at least one of $Y^1$, $Y^2$, and $Y^3$ representing a hydrolyzable group. $L^1$ represents a divalent linking group.

Preferred chain transfer agents are those in which $L^1$ represents —S-$Q^5$- with $Q^5$ being linked to the silicone atom in formula VIII and wherein $Q^5$ represents an organic divalent linking group such as for example a straight chain, branched chain or cyclic alkylene, arylene or aralkylene. The use of such chain transfer agent will generally result in fluorinated oligomers in which the monovalent organic group G corresponds to the following formula:

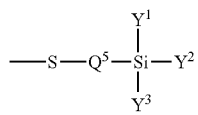

wherein $Y^1$, $Y^2$, $Y^3$, and $Q^5$ have the meaning as defined above.

A single chain transfer agent or a mixture of different chain transfer agents may be used. The preferred chain transfer agents are 2-mercaptoethanol, octylmercaptane, mercapto octadecyl propionate and 3-mercaptopropyltrimethoxysilane. A chain transfer agent is typically present in an amount sufficient to control the number of polymerized monomer units in the oligomer and to obtain the desired molecular weight of the fluorinated oligomeric silane. The chain transfer agent is generally used in an amount of about 0.05 to about 0.5 equivalents, preferably about 0.25 equivalents, per equivalent of total monomers present, including fluorinated and non-fluorinated monomers.

The fluorinated oligomeric silane useful in the composition of the present invention contains one or more hydrolyzable groups. These hydrolyzable groups may be introduced in the fluorinated oligomeric silane by oligomerising in the presence of a chain transfer agent having a silyl group containing one or more hydrolyzable groups, for example a chain transfer agent according to formula VIII above wherein at least one of $Y^1$, $Y^2$, and $Y^3$ represents a hydrolyzable group and/or by co-oligomerising with a monomer containing a silyl group having one or more hydrolyzable groups such as a monomer according to formula VII above wherein at least one of $Y^4$, $Y^5$, and $Y^6$ represents a hydrolyzable group. Alternatively, a functionalised chain transfer agent or functionalised comonomer can be used which can be reacted with a silyl group containing reagent subsequent to the oligomerization.

Thus, according to a first embodiment the fluorinated oligomeric silane can be prepared by oligomerizing a first fluorinated monomer, obtainable from the condensation of a fluorinated alcohol, a polyisocyanate and an isocyanate reactive non-fluorinated monomer, with a monomer according to formula VII above wherein at least one of $Y^4$, $Y^5$, and $Y^6$ represents a hydrolyzable group and optional non-fluorinated monomer in the presence of a chain transfer agent which may optionally also contain a silyl group such as for example a chain transfer agent according to formula VIII above wherein at least one of $Y^1$, $Y^2$, and $Y^3$ represents a hydrolyzable group.

As a variation to the above method the oligomerization may be carried out without the use of the silyl group containing monomer but with a chain transfer agent containing the silyl group.

A further embodiment for producing the fluorinated oligomeric silane, involves the polymerisation or oligomerisation of first fluorinated monomers, obtainable from the condensation of a fluorinated alcohol, a polyisocyanate and an isocyanate reactive non-fluorinated monomer, with an optional non-fluorinated monomer and a functionalised monomer in the presence of a chain transfer agent. Examples of such functionalized monomers include hydroxy or amino functionalised acrylate or methacrylates, such as 2-hydroxyethyl (meth)acrylate, 3-hydroxypropyl(meth)acrylate, 6-hydroxyhexyl(meth)acrylate and the like. Alternative to or in addition to the use of functionalised monomer, a functionalised chain transfer agent can be used. By the term "functionalised chain transfer agent" is meant a chain transfer agent that has one or more groups available for subsequent reaction, for example a group capable of undergoing a condensation reaction. Typically, the functionalised chain transfer agent is a chain transfer agent that has one or more groups capable of reacting with an isocyanate or epoxy group. Specific examples of such groups include hydroxy and amino groups. Examples of such chain transfer agents include 2-mercaptoethanol, 3-mercapto-2-butanol, 3-mercapto-2-propanol, 3-mercapto-1-propanol and 3-mercapto-1,2-propanediol, 11-mercapto-1-undecanol and 2-mercapto-ethylamine. Subsequent to the oligomerisation the functional group contained in the comonomer and/or chain transfer agent can be reacted with a compound including a silyl group having hydrolyzable groups and that is capable of reacting with the functional group contained in the comonomer and/or chain transfer agent.

Suitable compounds for reacting with the functional groups included in the monomer or chain transfer agent include compounds according to the following formula:

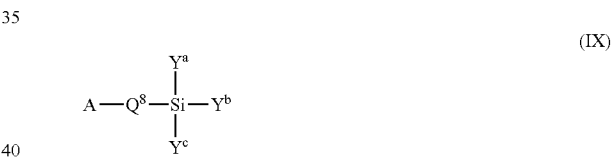

(IX)

wherein A represents a functional group capable of undergoing a condensation reaction with the functional group contained in the monomer or chain transfer agent, in particular a functional group capable of condensing with a hydroxy or amino functional oligomer. Examples of A include an isocyanate or an epoxy group; $Q^8$ represents an organic divalent linking group; $Y^a$, $Y^b$, and $Y^c$ each independently represents an alkyl group, preferably a $C_1$-$C_8$ alkyl group such as methyl, ethyl or propyl or an alkyl group containing a cycloalkyl such as cyclohexyl or cylcopentyl, an aryl group such as phenyl, an alkylaryl group or an aralkyl group or hydrolyzable group such as for example halogen, an alkoxy group such as methoxy, ethoxy or an aryloxy group and at least one of $Y^a$, and $Y^c$ represents a hydrolyzable group.

The organic divalent linking groups $Q^8$ preferably contain from 1 to about 20 carbon atoms. $Q^8$ can optionally contain oxygen, nitrogen, or sulfur-containing groups or a combination thereof. Illustrative examples of suitable linking groups $Q^8$ include straight chain, branched chain or cyclic alkylene, arylene, aralkylene, oxyalkylene, carbonyloxyalkylene, oxycarboxyalkylene, carboxyamidoalkylene, urethanylenealkylene, ureylenealkylene and combinations thereof. Particularly suitable linking groups are selected from the group consisting of alkylene, oxyalkylene and carbonyloxyalkylene.

Examples of compounds according to formula IX include 3-isocyanatopropyltrimethoxysilane and 3-epoxypropyltrimethoxysilane. When a hydroxy or amino functionalised chain transfer agent is used that is subsequently reacted with a compound according to formula IX wherein A is an isocyanato group, the resulting monovalent organic group G in the fluorinated oligomeric silane can generally be represented by the formula:

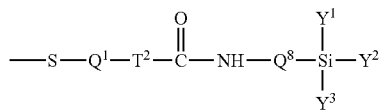

wherein $Q^1$, $Q^8$, $Y^1$, $Y^2$, and $Y^3$ have the meaning as defined above, and $T^2$ represents O or NR with R being hydrogen, an aryl, or a $C_1$ to $C_4$ alkyl group.

The condensation reaction is carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to about 10 percent, preferably about 0.1 percent to about 5 percent, by weight based on the total weight of the reactants.

The condensation reaction is preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. Suitable temperatures are between about room temperature and about 120° C.

Component (b) used in the fluorochemical composition of some embodiments of the present invention comprises one or more non-fluorinated compounds of an element M selected from the group consisting of Si, Ti, Zr, B, Al, Ge, V, Pb, Sn, and Zn having at least two hydrolyzable groups per molecule. Preferably, the hydrolyzable groups are directly bonded to the element M. In one embodiment of the present invention, component (b) comprises a compound according to the formula (X):

wherein $R^2$ represents a non-hydrolyzable group, M represents an element selected from the group consisting of Si, Ti, Zr, B, Al, Ge, V, Pb, Sn, and Zn, j is 3 or 4 depending on the valence of M, i is 0, 1, or 2, and $Y^7$ represents a hydrolyzable group.

The hydrolyzable groups present in component (b) may be the same or different and are generally capable of hydrolyzing for example under acidic or basic aqueous conditions, such that component (b) can undergo condensation reactions. Preferably, the hydrolyzable groups upon hydrolysis yield groups capable of undergoing condensation reactions, such as hydroxyl groups.

Typical examples of hydrolyzable groups in component (b) include those as described with respect to component (a). Particular suitable examples of component (b) include tetra-, tri- or dialkoxy (preferably containing 1 to 4 carbon atoms) compounds.

The non-hydrolyzable groups $R^2$ may be the same or different and are not capable of hydrolyzing. For example, the non-hydrolyzable groups $R^2$ may be independently selected from a hydrocarbon group, for example a $C_1$ to $C_{30}$ alkyl group, which may be straight chain or branched and may include one or more aliphatic, cyclic hydrocarbon structures, a $C_6$ to $C_{30}$ aryl group (optionally substituted by one or more substituents selected from halogens and $C_1$ to $C_4$ alkyl groups), or a $C_7$ to $C_{30}$ aralkyl group.

In one embodiment the non-hydrolyzable groups $R^2$ are independently selected from a hydrocarbon group, for example a $C_1$ to $C_{30}$ alkyl group and a $C_6$ to $C_{20}$ aryl group (optionally substituted by one or more substituents selected from halogens and $C_1$ to $C_4$ alkyl groups).

Particular suitable examples of compounds (b) include those in which M is Ti, Zr, Si, and Al.

Representative examples of component (b) include tetramethoxysilane, tetraethoxysilane, methyltriethoxysilane, methyltrimethoxysilane, dimethyl diethoxysilane, octadecyltriethoxysilane, octadecyltrimethoxysilane, methyl trichlorosilane, tetra-methyl orthotitanate, tetra ethyl orthotitanate, tetra-iso-propyl orthotitanate, tetra-n-propyl orthotitanate, tetra(2-ethylhexyl)titanate, tetraethyl zirconate, tetra-iso-propyl zirconate tetra-n-propyl zirconate and the like. More preferred compounds include $C_1$-$C_4$ alkoxy derivatives of Si, Ti, and Zr. Particularly suitable compounds (b) include tetraethoxysilane and tetra(2-ethylhexyl)titanate. Single compounds or mixtures of compounds (b) may be used.

Optionally, the fluorochemical composition may further comprise one or more crosslinking agents, in addition to the fluorinated oligomer (a) and the non-fluorinated compound (b), if any; in order to further increase the durability of the coating. The crosslinking agent may be selected from compounds with additional functionality from those of components (a) and (b). For example, the crosslinking agent may comprise a compound of an element $M^3$ that is selected from the group consisting of Si, Ti, Zr, B, Al, Ge, V, Pb, Sn, and Zn having at least one hydrolyzable group and at least one reactive functional group per molecule that is capable of engaging in a crosslinking reaction. Preferably, said at least one hydrolyzable group is directly bonded to the element $M^3$.

Suitable and preferred hydrolyzable groups include those groups mentioned with respect to components (a) and (b). If the crosslinking agent includes more than one hydrolyzable groups, these may be the same or different. Particularly suitable hydrolyzable groups are selected from $C_1$ to $C_4$ alkoxy groups, such as methoxy, ethoxy, iso- and (preferably) n-propoxy, or iso- and (preferably) n-butoxy groups.

The reactive functional group is a group in the cross-linking agent which is capable of engaging in a crosslinking reaction so as to provide further crosslinking functionality. The crosslinking reaction may involve for example irradiation, heating or a combination thereof. If the crosslinking agent includes more than one reactive functional groups, these groups may be the same or different.

Suitable reactive functional groups include groups that may react by condensation or addition reactions such as an amino group, an epoxy group, a mercaptan or an anhydride group. Further suitable reactive functional groups include groups that may react by free-radical polymerization, such as vinyl group and acrylate or methacrylate groups. Of these, free radically polymerizable groups, such as vinyl, acrylate or methacrylate groups, are particularly preferred reactive functional groups. Example of suitable crosslinking agents having a reactive functional group that can react by addition or condensation reactions, include epoxypropyltrimethoxysilane, bis(3-aminopropyltrimethoxysilyl)amine and aminopropyltrimethoxysilane Examples of suitable crosslinking agents having a free radically polymerizable group include vinyltrichlorosilane, vinyltrimethoxysilane, vinyltriethoxysilane and alkoxysilane functionalised acrylates or methacrylates, such as methacryloyloxypropyl trimethoxysilane.

The presence of such reactive functional groups, preferably free radically polymerizable, groups, is advantageous in that following the coating of the composition onto a substrate a two-fold curing can be carried out, i.e., a thermal or photochemically induced linking of the unsaturated organic radicals through radical polymerization and a thermal completion of the polycondensation (e.g., by elimination of water from groups M-OH still present). In the case an unsaturated compound is used, additionally a catalyst should typically be present for the thermal and/or photochemically induced curing of the coating composition applied onto a suitable substrate. Particularly preferred is the addition of a photopolymerization initiator. Such initiators are commercially available and include, e.g., Irgacure® 184 (1-hydroxycyclohexyl phenyl ketone), Irgacure®500 (1-hydroxycyclohexyl phenyl ketone, benzophenone), and other photo-initiators of the Irgacure®-type available from Ciba-Geigy; Darocur®-type photo-initiators, available from Merck, benzophenone and the like.

Examples of optionally employed thermal initiators are known to those skilled in the art and include, among others, organic peroxides in the form of diacyl peroxides, peroxydicarbonates, alkyl peresters, dialkyl peroxides, perketals, ketone peroxides and alkyl hydroperoxides. Specific examples of such thermal initiators are dibenzoyl peroxide, tertbutyl perbenzoate and azobisisobutyronitrile. These initiators are added to the coating composition in amounts known to one skilled in the art. Typically the initiator will be added in an amount from about 0.1 to about 2 percent by weight, based on the amount of crosslinking agent.

The compositions may further contain additives that provide the coating with additional properties, such as antimicrobial properties. Examples include $[C_{18}H_{37}N(CH_3)_2(CH_2)_3 Si(OCH_3)_3]^+Cl^-$. However, the addition of ionic additives is preferably kept below about 10 percent by weight, in order not to adversely affect the water repellency properties of the composition. Further suitable additive include UV stabilizers, UV-absorbers, micro- and nanoparticles, such as silica, zirconia or titania, pigments, fillers and the like.

In accordance with an embodiment of the invention, the fluorochemical composition may comprise a partial condensate or substantially complete condensation product of component (a) (fluorinated oligomeric silane of formula (I)) and optional crosslinking agent. In another embodiment of the invention, the fluorochemical composition may comprise a partial condensate or substantially complete condensation product obtainable by reacting component (a) (fluorinated oligomeric silane of formula (I)), component (b) (the non-fluorinated compound of an element M), and optional crosslinking agent.

The polycondensation reaction is conveniently carried out in the presence of sufficient water and an acid or base catalyst to effect hydrolysis of the hydrolyzable groups. Preferably, the amount of water will be from about 0.1 to about 20 percent by weight of the total composition, more preferably from about 0.5 and about 5 percent by weight. Suitable catalysts include organic and inorganic acid or base catalysts as given below. Typically the catalyst will be added in amounts from about 0.01 to about 0.1 percent by weight.

To achieve good hydrophobicity and durability, organic or inorganic acid or base catalyst should preferably be used. Organic acids include acetic acid, citric acid, formic acid, triflic acid, perfluorobutyric acid and the like. Examples of inorganic acids include sulphuric acid, hydrochloric acid and the like. Examples of useful base catalysts include sodium hydroxide, potassium hydroxide and triethylamine. Typically, the catalyst will be added in amounts from about 0.01 to about 10 percent, more preferably from about 0.05 to about 5 percent by weight of the fluorochemical composition.

In accordance with a particular suitable embodiment, compositions for application to a substrate are prepared by diluting a concentrate comprising a solution of at least 10% by weight of solids in an organic solvent, by adding to the concentrate an organic solvent or mixture of solvents. The weight ratio of compounds (a) to compounds (b) in the preparation of the fluorochemical composition may vary widely and is typically be from about 2:1 to about 1:100. In one particular embodiment, the weight ratio of compounds (a) to compounds (b) is from about 1:2 to about 1:50. It has been found that a very low amount of fluorochemical product can be used to achieve good repellency properties. Such compositions not only provide an environmental advantage but also provide a cost advantage. In a further particular embodiment, a fluorochemical composition is made in the absence of compound (b).

Typically the fluorochemical composition of the present invention is dissolved or dispersed in an organic solvent. The organic solvent or blend of organic solvents used must be capable of dissolving compound (a) and optional crosslinking agent and/or a mixture of compounds (a), (b), and optional crosslinking agent and the fluorinated condensates formed after reaction. Preferably, the organic solvent or blend of organic solvents used is capable of dissolving at least about 0.01 percent of the fluorochemical condensate. Furthermore, the solvent or mixture of solvents preferably has a solubility for water of at least about 0.1 percent, preferably about 1 percent by weight and a solubility for the acid or base catalyst of at least about 0.01 percent, preferably about 0.1 percent by weight. If the organic solvent or mixture of organic solvents do not meet these criteria, it may not be possible to obtain a homogeneous mixture of the fluorinated condensate, solvent(s), water, and catalyst.

Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether and dipropyleneglycol monomethylether. Particularly preferred solvents include ethanol, isopropylalcohol, methylethyl keton and acetone.

Fluorinated solvents may be used in combination with the organic solvents in order to improve solubility of the starting compounds and/or the fluorochemical condensate. Such fluorinated solvents will generally not be suitable for use on their own because they will generally not meet the requirements of solubility for water and acid or base unless they additionally contain hydrophilic groups such as $CF_3CH_2OH$.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

It will further be appreciated by one skilled in the art that the formation of fluorochemical condensates from components (a), (b), and optional crosslinking agents results in a mixture of compounds. A condensation sequence is described by Arkles (CHEMTECH (1977), v. 7 pp 766-78).

The fluorochemical composition of the present invention is generally applied to the substrate in amounts sufficient to produce a durable coating that is water and oil repellent. This coating can be extremely thin, e.g., from about 1 to about 50 nanometers, though in practice a useful coating may be thicker.

In one embodiment, the coating composition is typically a relatively diluted solution in solvent, comprising from about 0.01 to about 30 percent by weight, preferably from about 0.01 to about 20 percent by weight, and more preferably, from about 0.05 to about 5 percent by weight of component (a), i.e., fluorinated oligomeric silane and component (b), i.e., non-fluorinated compound and/or partial or substantially complete condensation product of components (a) and (b).

In a further embodiment, the coating composition is a relatively diluted solution in solvent comprising from about 0.01 to about 10 percent by weight, preferably from about 0.05 to about 5 percent by weight of component (a), i.e., fluorinated silane and/or partial or substantially complete condensation product of component (a).

Suitable substrates that can be treated in a particularly effective way with the fluorochemical composition of this invention include substrates having a hard surface that preferably has groups capable of reacting with the fluorochemical composition and/or the partial or complete polycondensation products thereof. Particularly suitable substrates include ceramics, glass, different metals, natural and man-made stone, polymeric materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), wood and fibrous substrates (such as textile, leather, carpet, paper). Various articles can be effectively treated with the fluorochemical composition of the present invention to provide a durable water and oil repellent coating thereon. Examples include ceramic tiles, bathtubs or toilets, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

To effect the treatment of a substrate, the fluorochemical composition, preferably in the form of a solvent composition as disclosed above, is applied to the substrate. The amount of fluorochemical composition to be coated on the substrate will generally be that amount sufficient to produce a coating which is water and oil repellent, such a coating having at 20° C. a contact angle with distilled water of at least 80°, and a contact angle with n-hexadecane of at least 40°, measured after drying and curing of the coating.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

A wide variety of coating methods can be used to apply a composition of the present invention, such as brushing, spraying, dipping, rolling, spreading, and the like. A preferred coating method for application of the fluorochemical composition includes spray application. A substrate to be coated can typically be contacted with the treating composition at room temperature (typically, from about 20° C. to about 25° C.). Alternatively, the mixture can be applied to substrates that are preheated at a temperature of, for example, from about 60° C. to about 150° C. This is of particular interest for industrial production, where, e.g., ceramic tiles can be treated immediately after the baking oven at the end of the production line. Following application, the treated substrate can be dried and cured at ambient or elevated temperature, e.g., from about 40° to about 300° C. and for a time sufficient to dry and cure. Alternatively, in addition with a thermal treatment, the coating composition may be cured by irradiation (e.g., by means of UV-irradiators, a laser, etc.) in a manner known per se, depending on the type and presence, respectively of an initiator. The process may also require a polishing step to remove excess material.

EXAMPLES

The following examples further illustrate the invention without the intention however to limit the invention thereto. All parts are by weight unless indicated otherwise.

A. Abbreviations

AIBN: azobisisobutyronitrile

A-174: $CH_2$=$C(CH_3)C(O)O(CH_2)_3$ $Si(OCH_3)_3$, available from Aldrich

A-160: $HS(CH_2)_3Si(OCH_3)_3$, available from Aldrich

DBTDL: Dibutyltin dilaurate

MeFBSEA: N-methyl perfluorobutyl sulfonamido ethylacrylate

MeFBSEMA: N-methyl perfluorobutyl sulfonamido ethylmethacrylate

MEHQ: mehyl hydroquinone

HOEA: 2-hydroxyethyl acrylate

HOPMA: hydroxypropyl methacrylate

TDI: toluene diisocyanate

TEOS: tetraethoxysilane, available from Aldrich

IPDI: isophorone diisocyanate

ODMA: octadecylmethacrylate

MeFBSE: N-methyl perfluorobutyl sulfonamido ethanol

MDI: 4,4'-methylenediphenylenediisocyanate

PAPI: polymethylenepolyphenyl isocyanate, available from Bayer

HFPO-alc: $F(CF(CF_3)CF_2O)_{6.85}$ $CF(CF_3)C(O)NHCH_2CH_2OH$, consisting of a mixture of oligomers with different chain lengths. The index 6.85 is indicative of the mathematical average of the number of repeating HFPO-units.

B. Methods of Application and Testing

Coating Method

In a first step, the substrates were cleaned and degreased with acetone. After cleaning, 0.1 to 1 percent solutions of fluorinated oligomeric silanes as given in the respective examples were applied onto the substrates, by spray application at 40 ml/minute. The substrates were dried and cured at 150° C. during 5 minutes.

Contact Angles

The treated substrates were tested for their contact angles versus water (W) and n-hexadecane (O) using an Olympus TGHM goniometer. The contact angles were measured before (initial) and directly after abrasion (abrasion). The values are the mean values of 4 measurements and are reported in degrees. The minimum measurable value for a contact angle was 20. A value<20 meant that the liquid spread on the surface.

Abrasion Test

The treated substrates were abraded using an Erichsen Cleaning Machine using CIF creme cleaner (Lever Faberge). 40 abrasion cycles were done.

C. Synthesis of Intermediates and Fluorochemical Compositions

1. Synthesis of (HFPO)-alc: $F(CF(CF_3)CF_2O)_{6.85} CF(CF_3)C(O)NHCH_2CH_2OH$ (HFPO)-alc was prepared from the corresponding (HFPO)-ester: $F(CF(CF_3)CF_2O)_{6.85}CF(CF_3)COOCH_3$.

A 1 liter 3-necked reaction flask was equipped with a stirrer, a condenser, a dropping funnel, a heating mantle and a thermometer. The flask was charged with 1000 g (HFPO)-ester. The mixture was heated to 40° C. and 43.4 g ethanolamine was added via the dropping funnel, over a period of 30 minutes. The reaction mixture was kept at 65° C. during 3 hours. FTIR analysis indicated complete conversion. The end product was purified as follows: 500 ml ethyl acetate were added and the organic solution was washed with 200 ml HCl (1N), followed by 2 washings with 200 ml brine. The organic phase was dried over $MgSO_4$. Ethyl acetate was evaporated with water jet vacuum, using a Büchi rotary evaporator. The product was dried at 50° C. during 5 hours, using oil pump vacuum (<1 mbar). An alternative purification step included evaporation of methanol, formed during reaction, via water jet vacuum, using a Büchi rotary evaporator (up to 75° C.=<100 mm Hg). Residual methanol was further removed with oil pump vacuum (up to 80° C., =<10 mbar). The (HFPO)-alc obtained, was a yellow coloured oil. The structure was confirmed by means of NMR.

2. Synthesis of Fluorinated Monomers (MF)

a. Synthesis of Fluorinated Monomers, Starting from an Oligomeric Fluorinated Alcohol, a Polyisocyanate and an Isocyanate Reactive Non-fluorinated Monomer Several fluorinated monomers were prepared according to the general procedure as given for MF-1: (MeFBSEA/$HSCH_2CH_2OH$: 4/1)/TDI/HOEA (equimolar amounts).

In a three necked flask equipped with a stirrer, heating mantle, thermometer and condenser, were placed 205.5 g (0.5 moles) MeFBSEA, 9.7 g (0.125 moles) $HSCH_2CH_2OH$, 144 g ethylacetate and 0.2 g AIBN. The reaction was degassed 3 times using nitrogen and vacuum and then heated up to 75° C. under nitrogen. After 4 hours, a second portion of 0.1 g AIBN was added. The reaction was continued overnight. 0.5 g AIBN was added and the reaction was continued for 6 hours at 75° C. under nitrogen. The reaction was cooled to 30° C. under nitrogen and 21.8 g (0.125 moles) 2,4 toluene diisocyanate (TDI) was added. The reaction mixture was heated up to 80° C. under nitrogen for 6 hours. Then 14.5 g (0.125 moles) 2-hydroxyethylacrylate (HOEA) was added, together with 2 drops DBTDL catalyst and 100 ppm MEHQ and phenothiazine. The reaction was continued overnight at 70° C. under nitrogen. A clear, slightly yellow solution resulted. IR analysis indicated complete conversion of all isocyanate groups.

Further urethane based fluorinated monomers (MF-2 to MF-6) were prepared using the above procedure and starting from the reactants as given in table 1. All reactants were used in equimolar amounts.

TABLE 1

Composition of fluorinated monomers

| MF | Oligomeric fluorinated alcohol | Polyisocyanate | Isocyanate reactive non-fluorinated monomer |
|---|---|---|---|
| MF-1 | MeFBSEA/$HSCH_2CH_2OH$: 4/1 | TDI | HOEA |
| MF-2 | MeFBSEA/$HSCH_2CH_2OH$: 8/1 | TDI | HOEA |
| MF-3 | MeFBSEMA/$HSCH_2CH_2OH$: 4/1 | TDI | HOEA |
| MF-4 | MeFBSEA/11-mercapto-1-undecanol: 4/1 | TDI | HOEA |
| MF-5 | MeFBSEA/$HSCH_2CH_2OH$ | IPDI | HOEA |
| MF-6 | MeFBSEA/$HSCH_2CH_2OH$ | IPDI | HOPMA | b. Synthesis of Fluorinated Monomers, Starting from a Fluorinated Alcohol or a Perfluoropolyether Alcohol, a Polyisocyanate and an Isocyanate Reactive Non-Fluorinated Monomer Several fluorinated monomers were prepared according to the procedure given for MF-7: MeFBSE/MDI/HOEA (1/1.1/1)

In a three necked flask equipped with a stirrer, heating mantle, thermometer and condenser were placed 35.7 g (0.1 moles) MeFBSE, 27.5 g MDI (0.11 moles) and 72 g dry MEK. The mixture was heated to 80° C. under nitrogen and reacted for 6 hours. Then 18.7 g (0.11 moles) HOEA were added together with a spoon tip of MEHQ and phenothiazine as well as one drop of DBTDL catalyst. The reaction was continued for 16 hours at 80° C. under nitrogen. A hazy solution was obtained. IR analysis confirmed complete reaction of all isocyanate groups.

Further urethane based fluorinated monomers (MF-8 to MF-12) were prepared using the above procedure and starting from the reactants as given in table 2. Except otherwise indicated (e.g., MF-11), all reactants were used in equimolar amounts.

TABLE 2 composition of fluorinated monomers

| MF | Fluorinated alcohol | Isocyanate | Non-fluorinated monomer |
|---|---|---|---|
| MF-7 | MeFBSE | MDI | HOEA |
| MF-8 | MeFBSE | MDI | HOPMA |
| MF-9 | MeFBSE | TDI | HOEA |
| MF-10 | MeFBSE | IPDI | HOEA |
| MF-11 | 2 MeFBSE | PAPI | HOEA |
| MF-12 | HFPO-alc | MDI | HOEA |

3. Synthesis of Fluorinated Oligomeric Silanes (FC)

Several fluorinated oligomeric silanes were prepared according to the procedure as outlined below for FC-1: MF-1/A-174/ODMA/A-160 (equimolar amounts).

In a three necked flask equipped with a stirrer, thermometer, condenser and heating mantle were placed 80.4 g of a 50% solids solution in ethylacetate of the urethane based fluorinated monomer MF-1 (0.02 moles), 5 g (0.02 moles) A-174, 4 g (0.02 moles) A-160, 6.8 g ODMA (0.02 moles) and 0.2 g AIBN. After the reaction mixture was degassed 3 times using nitrogen and vacuum, the reaction was done at 70° C. for 6 hours. Then additionally 0.1 g AIBN were added and the reaction was continued overnight. A clear solution resulted.

Further fluorinated oligomeric silanes were prepared essentially according to the above procedure and using the reactive compounds in molar amounts as given in table 3. Fluorinated oligomeric silanes FC-13 to FC-25 were made in MEK and the reaction was done at 75° C. instead of 70° C.

TABLE 4 composition of comparative fluorochemical compositions (CFC)

| Number | Composition | Prepared according to |
|---|---|---|
| CFC-1 | MeFBSEA/A-170/A-160 4/1/1 | EP 1 369 453 (FS-2) |
| CFC-2 | MeFBSEA/HSCH$_2$CH$_2$OH (4/1) + isocyanato propyl triethoxysilane | EP 1 225 187 (FS-10) |

D. Examples

Examples 1 to 15 and Comparative Examples C-1 and C-2

In examples 1 to 15 fluorochemical compositions were prepared by mixing the fluorinated oligomeric silanes FC-1 to FC-12 with metalalkoxides in amounts as given in table 5. The mixtures were diluted to 1 percent solids in ethanol further containing 1 percent HCl (37 percent). The compositions were sprayed to white, glazed tiles, at room temperature. Excess product was removed immediately with a 3M High Performance wipe. Samples were left to cure at room temperature for 24 hours. Comparative examples C-1 and C-2

TABLE 3

Fluorinated oligomeric silanes (FC)

| FC | fluorinated monomer (MF) | A-174 | non-fluorinated monomer | Chain transfer agent |
|---|---|---|---|---|
| FC-1 | 0.02 moles MF-1 | 0.02 | 0.02 moles ODMA | 0.02 moles A-160 |
| FC-2 | 0.02 moles MF-1 | 0.1 | / | 0.02 moles A-160 |
| FC-3 | 0.02 moles MF-1 | 0.02 | 0.6 moles VCl$_2$ | 0.02 moles A-160 |
| FC-4 | 0.02 moles MF-1 | 0.1 | / | 0.02 moles octylmercaptane |
| FC-5 | 0.02 moles MF-1 | 0.02 | 0.02 moles ODMA + 0.06 moles VCl$_2$ | 0.02 moles octylmercaptane |
| FC-6 | 0.02 moles MF-2 | 0.02 | / | 0.02 moles A-160 |
| FC-7 | 0.02 moles MF-3 | 0.02 | / | 0.02 moles A-160 |
| FC-8 | 0.02 moles MF-4 | 0.02 | / | 0.02 moles A-160 |
| FC-9 | 0.02 moles MF-5 | 0.02 | / | 0.02 moles A-160 |
| FC-10 | 0.02 moles MF-6 | 0.02 | / | 0.02 moles A-160 |
| FC-11 | 0.02 moles MF-5 | 0.1 | / | 0.02 moles A-160 |
| FC-12 | 0.02 moles MF-5 | 0.02 | 0.02 moles ODMA | 0.02 moles A-160 |
| FC-13 | 0.1 mole MF-7 | 0.025 | / | 0.025 moles A-160 |
| FC-14 | 0.1 mole MF-7 | 0.025 | 0.025 moles ODMA | 0.025 moles A-160 |
| FC-15 | 0.1 mole MF-7 | 0.025 | 0.05 moles ODMA | 0.025 moles A-160 |
| FC-16 | 0.12 mole MF-7 | 0.02 | 0.02 moles ODMA | 0.02 moles A-160 |
| FC-17 | 0.12 mole MF-7 | 0.03 | 0.046 moles ODMA | 0.02 moles A-160 |
| FC-18 | 0.12 mole MF-7 | 0.03 | 0.046 moles isostearylacrylate | 0.02 moles A-160 |
| FC-19 | 0.1 mole MF-8 | 0.025 | 0.025 moles ODMA | 0.025 moles A-160 |
| FC-20 | 0.1 mole MF-9 | 0.025 | 0.025 moles ODMA | 0.025 moles A-160 |
| FC-21 | 0.1 mole MF-10 | 0.025 | 0.025 moles ODMA | 0.025 moles A-160 |
| FC-22 | 0.1 mole MF-11 | 0.025 | 0.025 moles ODMA | 0.025 moles A-160 |
| FC-23 | 0.12 mole MF-7 | 0.03 | 0.046 moles ODMA | 0.02 moles mercapto octadecylpropionate |
| FC-24 | 0.1 mole MF-12 | 0.025 | 0.025 moles ODMA | 0.025 moles A-160 |
| FC-25 | 0.1 mole MF-7 | / | / | 0.025 moles A-160 |

4. Synthesis of Comparative Fluorochemical Compositions (CFC)

Comparative fluorochemical compositions CFC-1 to CFC-3 were prepared according to methods known in the art. Their composition and reference for synthesis are given in table 4.

were made in the same way, but using comparative fluorochemical compositions CFC-1 and CFC-2 respectively. Contact angles were measured using an Olympus TGHM goniometer initially and after mechanical abrasion with an Erichsen cleaner and detergent CIF (available from Lever Faberge) for 40 cycles. The results are summarized in table 5.

TABLE 5

Contact angles of tiles treated with fluorochemical compositions

| Ex No | Fluorinated oligomer (g active solids) | Metal alkoxide (g) | DIW Initial | DIW Abraded | n-Hexadecane Initial | n-Hexadecane Abraded |
|---|---|---|---|---|---|---|
| 1 | FC-1 (10 g) | TEOS (90 g) | 110 | 78 | 68 | 50 |
| 2 | FC-1 (7 g) | Tetra(2-ethylhexyl)titanate (3 g) | 115 | 82 | 64 | 45 |
| 3 | FC-1 (10 g) | $CH_3Si(OCH_3)_3$ (10 g) | 108 | 75 | 67 | 49 |
| 4 | FC-1 (10 g) | TEOS (45 g) + $CH_3Si(OCH_3)_3$ (45 g) | 110 | 78 | 65 | 46 |
| 5 | FC-1 (7 g) | $C_{18}H_{37}Si(OCH_3)_3$ (3 g) | 112 | 80 | 63 | 51 |
| 6 | FC-2 (10 g) | TEOS (90 g) | 105 | 85 | 65 | 52 |
| 7 | FC-3 (10 g) | TEOS (90 g) | 113 | 77 | 62 | 50 |
| 8 | FC-5 (10 g) | TEOS (90 g) | 106 | 75 | 63 | 50 |
| 9 | FC-6 (10 g) | TEOS (90 g) | 108 | 80 | 69 | 46 |
| 10 | FC-8 (10 g) | TEOS (90 g) | 115 | 85 | 70 | 53 |
| 11 | FC-9 (10 g) | TEOS (90 g) | 111 | 81 | 67 | 47 |
| 12 | FC-12 (10 g) | TEOS (90 g) | 106 | 77 | 64 | 45 |
| 13 | FC-4 (7 g) | Tetra(2-ethylhexyl)titanate (3 g) | 108 | 78 | 63 | 48 |
| 14 | FC-10 (10 g) | $CH_3Si(OCH_3)_3$ (10 g) | 105 | 79 | 65 | 51 |
| 15 | FC-11 (10 g) | $C_{18}H_{37}Si(OCH_3)_3$ (2 g) | 107 | 80 | 62 | 47 |
| C-1 | CFC-1 (10 g) | TEOS (90 g) | 108 | 70 | 64 | 42 |
| C-2 | CFC-2 (10 g) | TEOS (90 g) | 100 | 65 | 62 | 40 |

Examples 16 to 32 and Comparative Examples C-3 and C-4

For examples 16 to 32 fluorinated oligomeric silanes FC-13 to FC-25 were heated to 60° C. to completely dissolve and further diluted to 1% solids in MEK. To these diluted mixtures were added 4 g/100 g MEK metal alkoxide or mixtures thereof as indicated in table 6 and 1 percent of HCl (37 percent). The compositions were sprayed on white, glazed tiles, at room temperature. Excess product was removed immediately with a 3M High Performance wipe. Samples were left to cure at room temperature for 24 hours. Comparative examples C-3 and C-4 were made in the same way, but using comparative fluorochemical compositions CFC-1 and CFC-2 respectively. Contact angles were measured using an Olympus TGHM goniometer initially, after 16 hours contact with 18 percent HCl and after mechanical abrasion with an Erichsen cleaner and detergent CIF (available from Lever Faberge) for 40 cycles. The results are summarized in table 6.

TABLE 6

Contact angles of tiles treated with fluorochemical compositions

| Ex | Fluorinated oligomeric silane (1 g/100 g MEK) | Metal alkoxide (4 g/100 g MEK) | DIW Initial | DIW HCl | DIW Abraded | n-hexadecane Initial | n-hexadecane HCl | n-hexadecane Abraded |
|---|---|---|---|---|---|---|---|---|
| 16 | FC-13 | TEOS | 105 | 95 | 85 | 64 | 62 | 45 |
| 17 | FC-13 | * | 110 | 92 | 80 | 65 | 60 | 45 |
| 18 | FC-13 | ** | 110 | 90 | 80 | 60 | 58 | 42 |
| 19 | FC-13 | *** | 112 | 90 | 85 | 62 | 58 | 42 |
| 20 | FC-14 | TEOS | 112 | 92 | 83 | 65 | 60 | 46 |
| 21 | FC-15 | TEOS | 108 | 90 | 83 | 62 | 61 | 45 |
| 22 | FC-16 | TEOS | 107 | 90 | 82 | 64 | 58 | 40 |
| 23 | FC-17 | TEOS | 115 | 93 | 91 | 67 | 62 | 52 |
| 24 | FC-18 | TEOS | 106 | 90 | 82 | 62 | 60 | 48 |
| 25 | FC-19 | TEOS | 105 | 92 | 83 | 64 | 58 | 49 |
| 26 | FC-20 | TEOS | 96 | 87 | 75 | 62 | 55 | 40 |
| 27 | FC-21 | TEOS | 96 | 90 | 70 | 61 | 54 | 38 |
| 28 | FC-22 | TEOS | 105 | 90 | 74 | 65 | 55 | 40 |
| 29 | FC-23 | TEOS | 112 | 92 | 85 | 65 | 59 | 47 |
| 30 | FC-24 | TEOS | 100 | 85 | 76 | 67 | 58 | 40 |
| 31 | FC-25 | TEOS | 105 | 90 | 80 | 67 | 62 | 48 |
| 32 | FC-13 | / | 100 | 85 | 75 | 64 | 54 | 38 |
| C-3 | CFC-1 | TEOS | 108 | 90 | 70 | 62 | 62 | 32 |
| C-4 | CFC-2 | TEOS | 106 | 88 | 63 | 62 | 53 | 28 |

Note:
* = $CH_3Si(OCH_2CH_3)_3$
** = $(CH_3)_2Si(OCH_2CH_3)_2$
*** = 0.5 g $C_{18}H_{37}Si(OCH_3)_3$ + 3.5 g TEOS

Various modifications and alterations of this invention will become apparent to those skilled in the art without departing from the scope and spirit of this invention.

What is claimed is:

1. A fluorochemical composition comprising:
   (a) a fluorinated oligomeric silane being represented by the general formula:

$$X\text{-}M^f{}_n M^h{}_m M^a{}_r\text{-}G \qquad (I)$$

wherein X represents an end group; $M^f$ represents units derived from fluorinated monomers obtainable from a condensation of a monofunctional perfluoropolyether alcohol, a polyisocyanate, and an isocyanate reactive non-fluorinated monomer; $M^h$ represents units derived from non-fluorinated monomers; $M^a$ represents units having a silyl group represented by the formula:

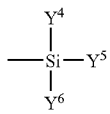

wherein each of $Y^4$, $Y^5$, and $Y^6$ independently represents an alkyl group, an aryl group, or a hydrolyzable group and at least one of $Y^4$, $Y^5$, and $Y^6$ represents a hydrolyzable group; G is a monovalent organic group comprising the residue of a chain transfer agent; n represents a value of 1 to 100; m represents a value of 0 to 100; r represents a value of 0 to 100; and n+m+r is at least 2;
   with the proviso that at least one of the following conditions is fulfilled: (i) G is a monovalent organic group that contains a silyl group of the formula:

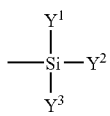

wherein $Y^1$, $Y^2$, and $Y^3$ each independently represents an alkyl group, an aryl group or a hydrolyzable group with at least one of $Y^1$, $Y^2$, and $Y^3$ representing a hydrolyzable group; or (ii) r is at least 1; and
   optionally, (b) a non-fluorinated compound of an element M selected from the group consisting of Si, Ti, Zr, B, Al, Ge, V, Pb, Sn, and Zn and having at least two hydrolyzable groups per molecule;
   wherein said fluorinated oligomeric silane and said non-fluorinated compound, if present, are dissolved or dispersed in an organic solvent.

2. A fluorochemical composition according to claim 1 wherein said units $M^h$ derive from a non-fluorinated monomer according to the general formula:

$$R^h\text{-}L_k\text{-}E$$

wherein $R^h$ represents a hydrogen atom or a non-fluorinated organic group, L represents an organic divalent linking group, k is 0 or 1, and E represents an ethylenically unsaturated group.

3. A fluorochemical composition according to claim 1 wherein said non-fluorinated compound (b) corresponds to the formula:

$$(R^2)_i M(Y^7)_{j-i}$$

wherein $R^2$ represents a non-hydrolyzable group, M represents an element selected from the group consisting of Si, Ti, Zr, B, Al, Ge, V, Pb, Sn, and Zn, j is 3 or 4 depending on the valence of M, i is 0, 1, or 2, and $Y^7$ represents a hydrolyzable group.

4. A fluorochemical composition according to claim 1 wherein the weight ratio of fluorinated oligomeric silane of formula (I) to non-fluorinated compound (b) is from about 2:1 to about 1:100.

5. A fluorochemical composition according to claim 1 wherein said composition is in the form of a concentrate comprising said fluorinated oligomeric silane in an amount of at least about 5 percent by weight.

6. A fluorochemical composition according to claim 1 wherein said composition is in a diluted form comprising said fluorinated oligomeric silane in an amount of about 0.01 to about 5 percent by weight.

7. A fluorochemical composition according to claim 1 further comprising an acid or base catalyst and water.

8. A fluorochemical composition comprising a reaction product of said fluorinated oligomeric silane of formula (I) and said non-fluorinated compound (b) as defined in claim 1.

9. A product obtainable from a reaction of said fluorinated oligomeric silane of formula (I) and said non-fluorinated compound (b) as defined in claim 1.

10. Method of treating a substrate comprising applying a fluorochemical composition as defined in claim 1 to said substrate.

11. Method according to claim 10 further comprising heating said substrate.

12. A composition comprising a fluorinated oligomeric silane represented by the general formula:

$$X\text{-}M^f{}_n M^h{}_m M^a{}_r\text{-}G \qquad (I)$$

wherein X represents an end group; $M^f$ represents units derived from first fluorinated monomers obtainable from a condensation of a fluorinated alcohol, a polyisocyanate, and an isocyanate reactive non-fluorinated monomer, wherein said fluorinated alcohol is an oligomeric fluorinated alcohol obtainable from a free radical polymerization of a second fluorinated monomer and optionally a non-fluorinated monomer in the presence of a chain transfer agent having at least one hydroxyl group; $M^h$ represents units derived from non-fluorinated monomers; $M^a$ represents units having a silyl group represented by the formula:

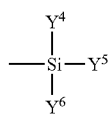

wherein each of $Y^4$, $Y^5$, and $Y^6$ independently represents an alkyl group, an aryl group or a hydrolyzable group and at least one of $Y^4$, $Y^5$, and $Y^6$ represents a hydrolyzable group; G is a monovalent organic group comprising the residue of a chain transfer agent; n represents a value of 1 to 100; m represents a value of 0 to 100; r represents a value of 0 to 100; and n+m+r is at least 2;
    with the proviso that at least one of the following conditions is fulfilled: (i) G is a monovalent organic group that contains a silyl group of the formula:

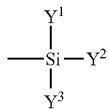

wherein $Y^1$, $Y^2$, and $Y^3$ each independently represents an alkyl group, an aryl group, or a hydrolyzable group with at least one of $Y^1$, $Y^2$, and $Y^3$ representing a hydrolyzable group or (ii) r is at least 1.

13. A fluorochemical composition according to claim 12 wherein said second fluorinated monomer corresponds to the formula:

$$R_f\text{-}Q\text{-}E^1$$

wherein $R_f$ represents a fluorinated aliphatic group having at least 3 carbon atoms, Q represents a non-fluorinated divalent linking group, and $E^1$ is an ethylenically unsaturated group.

14. A fluorochemical composition according to claim 12 wherein said chain transfer agent is a mercaptan compound having at least one hydroxyl group.

15. Method of treating a substrate comprising applying a fluorochemical composition as defined in claim 12 to said substrate.

16. Method according to claim 15 further comprising heating said substrate.

17. Method according to claim 15 wherein said substrate comprises glass, ceramic, metal, a fibrous or a polymeric substrate.

18. The composition according to claim 12, further comprising a non-fluorinated compound of an element M selected from the group consisting of Si, Ti, Zr, B, Al, Ge, V, Pb, Sn, and Zn and having at least two hydrolyzable groups per molecule, wherein said fluorinated oligomeric silane and said non-fluorinated compound are dissolved or dispersed in an organic solvent.

19. The composition according to claim 18, wherein said non-fluorinated compound corresponds to the formula:

$$(R^2)_i M(Y^7)_{j-i}$$

wherein $R^2$ represents a non-hydrolyzable group, M represents an element selected from the group consisting of Si, Ti, Zr, B, Al, Ge, V, Pb, Sn, and Zn, j is 3 or 4 depending on the valence of M, i is 0, 1, or 2, and $Y^7$ represents a hydrolyzable group.

20. A fluorochemical composition according to claim 12, further comprising an acid or base catalyst and water.

* * * * *

UNITED STATES PATENT AND TRADEMARK OFFICE
CERTIFICATE OF CORRECTION

| | | |
|---|---|---|
| PATENT NO. | : 7,728,098 B2 | Page 1 of 1 |
| APPLICATION NO. | : 11/460303 | |
| DATED | : June 1, 2010 | |
| INVENTOR(S) | : Rudolf Dams | |

It is certified that error appears in the above-identified patent and that said Letters Patent is hereby corrected as shown below:

Column 1
Line 61(approx.), after "formula" insert -- (I): --.

Column 3
Line 37, delete "$Y^1\ Y^2$ and $Y^3$" and insert in place thereof -- $Y^1$, $Y^2$, and $Y^3$ --.

Column 6
Line 35 (approx.), delete "$(MF)_r(MH)_s$represents" and insert in place thereof
-- $(MF)_r(MH)_s$ represents --.

Column 21
Line 14 (approx.), delete "value<20" and insert in place thereof -- value <20 --.

Column 27
Line 55 (approx.), in Claim 2, delete "$M^h$derive" and insert in place thereof
-- $M^h$ derive --.

Signed and Sealed this
Twenty-second Day of February, 2011

David J. Kappos
*Director of the United States Patent and Trademark Office*